M. NIELL.
CAMERA.
APPLICATION FILED JUNE 26, 1918.

1,410,029.

Patented Mar. 21, 1922.
4 SHEETS—SHEET 1.

INVENTOR
Magnus Niell
BY
Clifford T. Dunn
ATTORNEY

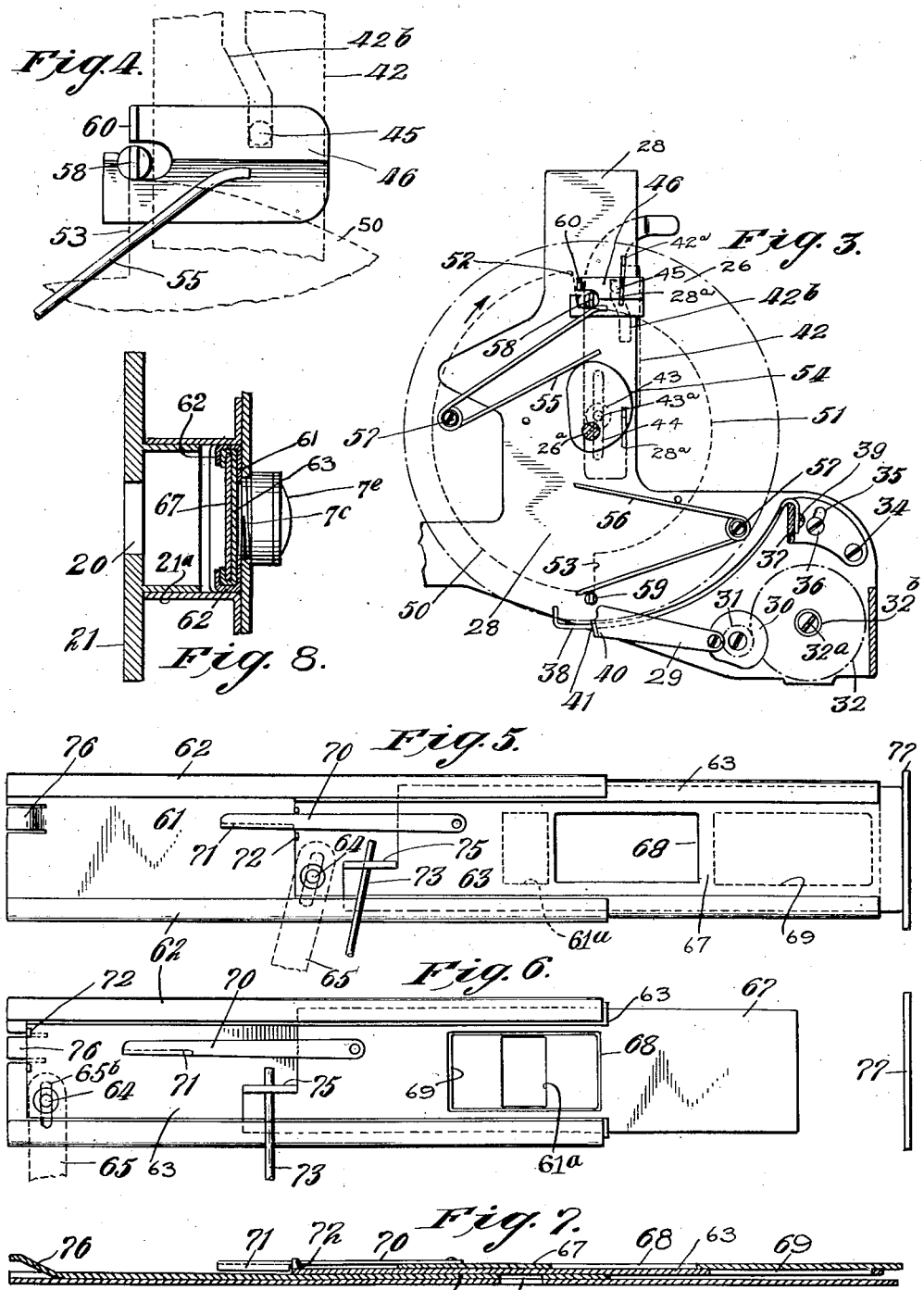

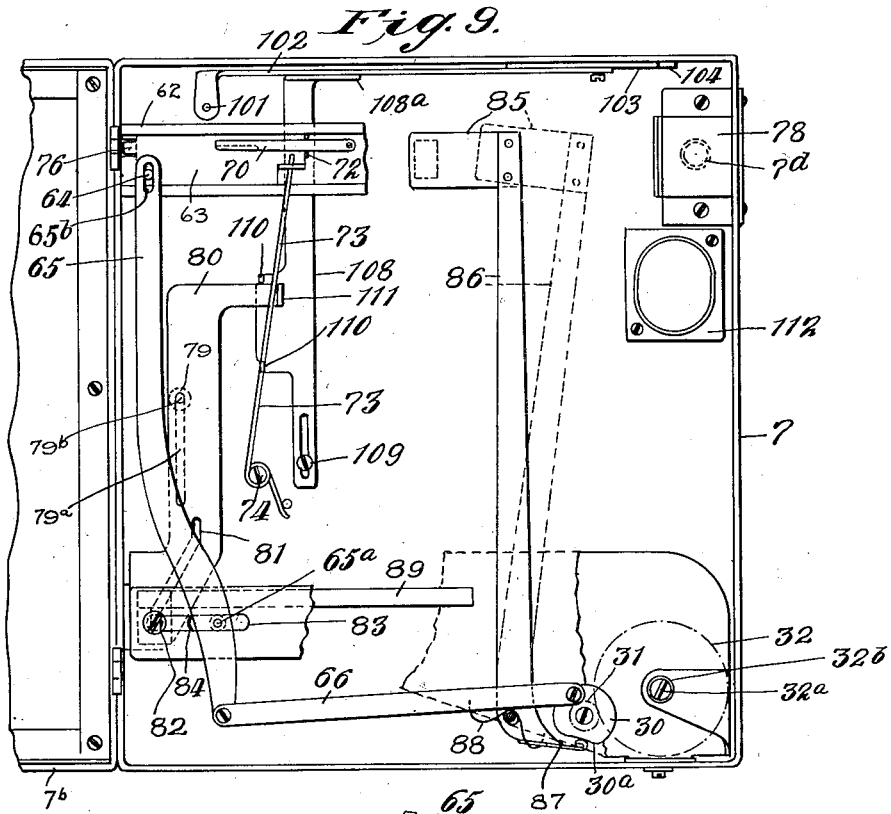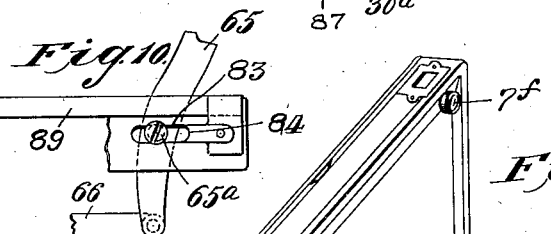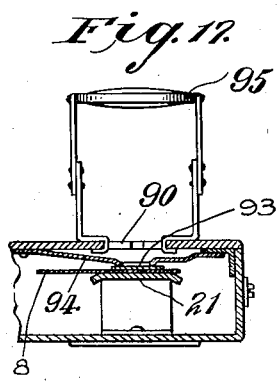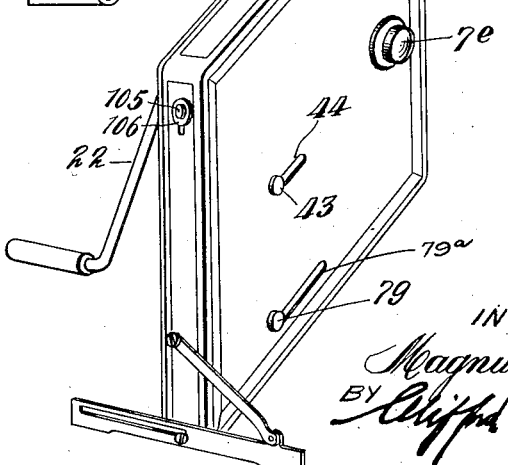

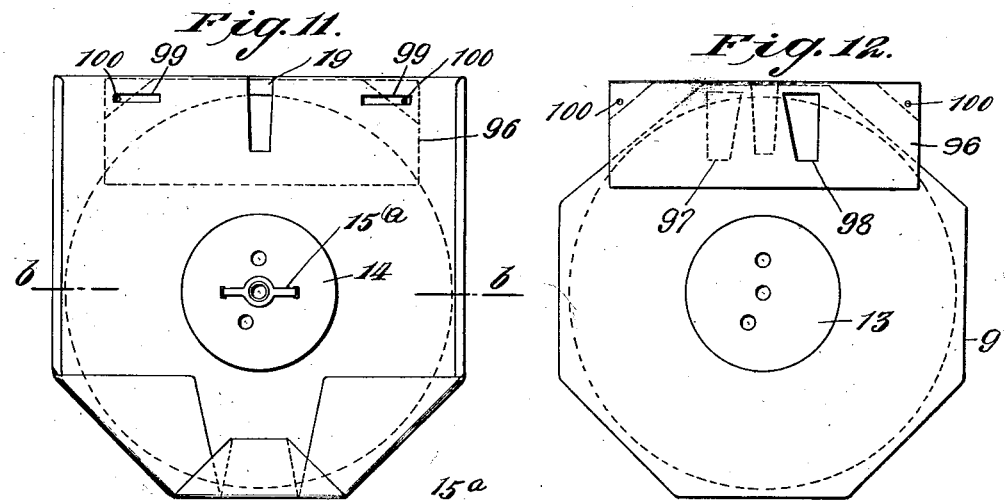

UNITED STATES PATENT OFFICE.

MAGNUS NIÉLL, OF STOCKHOLM, SWEDEN.

CAMERA.

1,410,029.  Specification of Letters Patent.  Patented Mar. 21, 1922.

Application filed June 26, 1918. Serial No. 241,925.

*To all whom it may concern:*

Be it known that I, MAGNUS NIÉLL, a subject of the King of Sweden, residing at Stockholm, Sweden, have invented certain new and useful Improvements in Cameras, of which the following is a specification.

The present invention relates generally to the art of photography and is more especially directed to improvements in camera construction and operation.

Heretofore various attempts have been made to provide a camera for taking so-called moving or motion pictures which would be particularly adapted to the purposes and requirements of amateur photographers. However, these prior efforts did not meet with general success by reason of the fact that the devices were not only cumbersome, but embodied numerous operative parts which made their manufacture or production expensive, so that they could not be sold at a price which would create a demand for them.

The principal object of the present invention is to provide a camera for taking pictures of moving objects which will be especially adaptable to the requirements of amateur photographers, as well as professionals, the camera being of a compact construction and embodying comparatively few operating parts so that it may be cheaply made and assembled, thereby making the device an economical one to produce.

A further object of my invention is to provide a camera having the general characteristics aforesaid which may also be used for projecting moving or motion pictures on a screen, or in the form of a graphoscope wherein the moving pictures within the camera may be viewed through a sight opening in the casing thereof.

My invention also contemplates the employment of a circular film and an improved form of film holder or magazine which embodies an operative film masking medium, which is adapted to be actuated by the functioning of the camera mechanism.

From the foregoing it will be observed that my invention generally comprehends a camera having a multiplicity of uses not heretofore embodied in a single device, the structure for functioning the camera to serve the various purposes, to which it is applicable, being of a character whereby my invention will be simple and convenient to use so that satisfactory results may be obtained by those unskilled in the use of such devices.

Other objects and advantages of my invention will become manifest as I proceed with the disclosure thereof, and I would have it clearly understood that I do not limit myself to the specific uses and structural details herein illustrated and described, but reserve unto myself the full range of equivalents thereof, to which I am entitled under my invention in its broadest aspect.

In order to afford a clear and comprehensive understanding of my invention, I have elected to show and describe one embodiment which I have found to be generally satisfactory to the purposes of both professional and amateur photographers, it being obvious that my invention may take other shapes or forms and that the operating parts may be differently located or arranged and of different structure without departing from the spirit and scope of my invention.

I shall now proceed to describe my invention with reference to the accompanying drawings and then point out with more particularity the essential elements of novelty therein in the appended claims.

Figure 2:
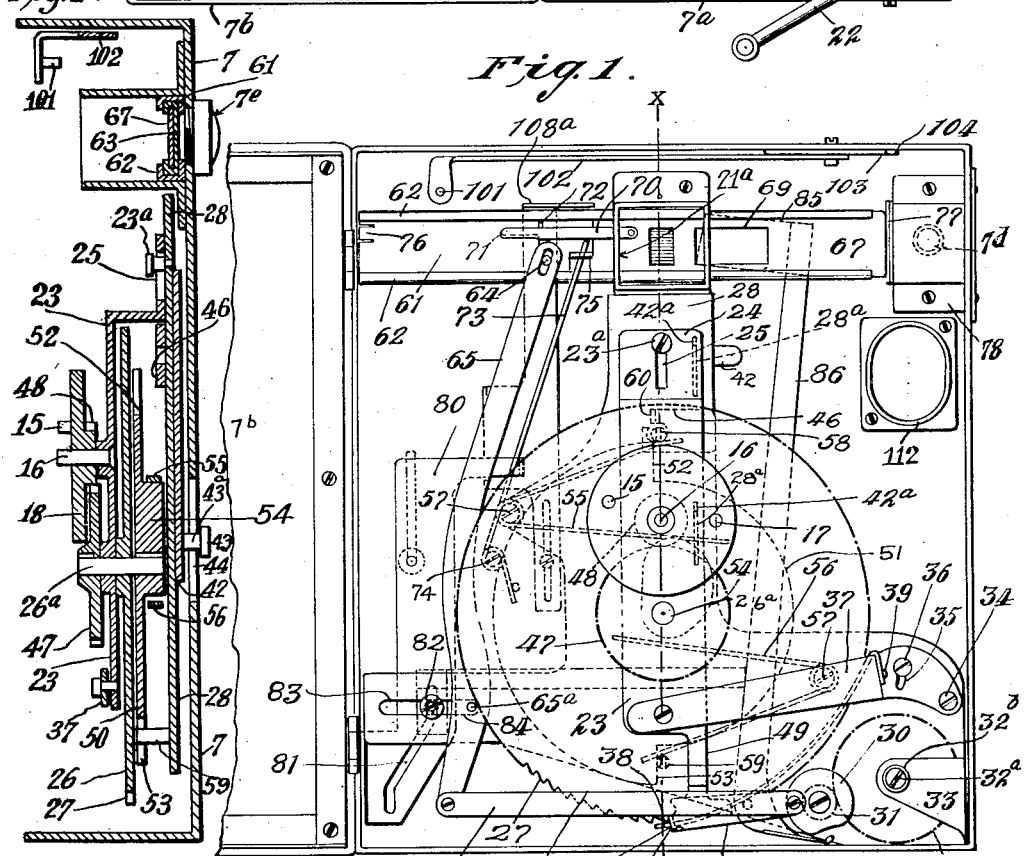
Fig. 2 is an enlarged plan view of the right hand half of the structure shown in Fig. 1, disclosing the operating mechanism.

Fig. 2$^a$ is an enlarged sectional view on the line $x$—$x$ of Fig. 2.

Figs. 3 and 4 are enlarged details of portions of the film operating mechanism disclosed in Fig. 2.

Fig. 5 is an enlarged plan view of the shutter operating mechanism, when the shutter is in closed position.

Fig. 6 is an enlarged plan view of the shutter operating mechanism when the shutter is in exposure position.

Fig. 7 is a longitudinal section of the shutter operating mechanism with the parts in the same relative position as illustrated in Fig. 5.

Fig. 8 is a transverse section showing the co-operative relation of the shutter and its controlling elements with the lens of the camera.

Fig. 9 is an enlarged plan view of a portion of the mechanism illustrated in Fig. 2 showing the relative positions of the shutter and its controlling elements when the camera is functioning as a projector or graphoscope.

Fig. 10 is an enlarged detail of a portion of the mechanism illustrated in Fig. 9.

Figs. 11 and 12 are plan views of the film magazine or holder taken from opposite sides thereof.

Fig. 13 is a sectional elevation taken on the line $b$—$b$ of Fig. 11 and showing the disposition of the film within the holder.

Fig. 14 is a plan view of a film such as used in conjunction with my invention.

Fig. 15 is an enlarged detail of the means employed for operating the film holder magazine.

Fig. 16 is a view in perspective of my improved camera, projector and graphoscope showing the operating crank and a form of supporting means; and Fig. 17 is a fragmentary sectional elevation showing the manner whereby my device may be used to advantage as a graphoscope for the exhibition of moving pictures.

Referring now to the drawings in detail in which like characters of reference are employed to designate similar parts throughout the several views, 7 represents the casing of the camera which is preferably rectangular in configuration, as shown, and may be of wood or metal covered with leather or the like. This casing embodies the body portion 7$^a$ and the closure or cover 7$^b$ hinged or otherwise fastened thereto, the front face of the casing being apertured at 7$^c$ and 7$^d$ for the lens 7$^e$ and range finder 7$^f$, respectively. In lieu of the strip film, such as ordinarily employed in cameras, I use a circular film 8 which is sensitized adjacent to its edges to provide for a double row of exposures 8$^a$ and 8$^b$, as shown in Fig. 14. Two of these films are contained within the holder or magazine 9 which may be made of paper and of any desired or suitable shape or size, the films being separated by a disc of light-proof material 9$^a$. Each film is apertured at 10, 11 and 12, these apertures registering with similarly disposed apertures in the disc of light-proof material 9$^a$ and with those in the discs 13 and 14, each of which latter covers a centrally located opening in each side of the film holder, as shown in Figs. 11 and 12. These discs 13 and 14 and the films 8, together with the separating disc 9$^a$ are fastened together by the staple 15$^a$ passing therethrough, the object of this construction or arrangement being hereinafter more fully explained.

Figure 1:
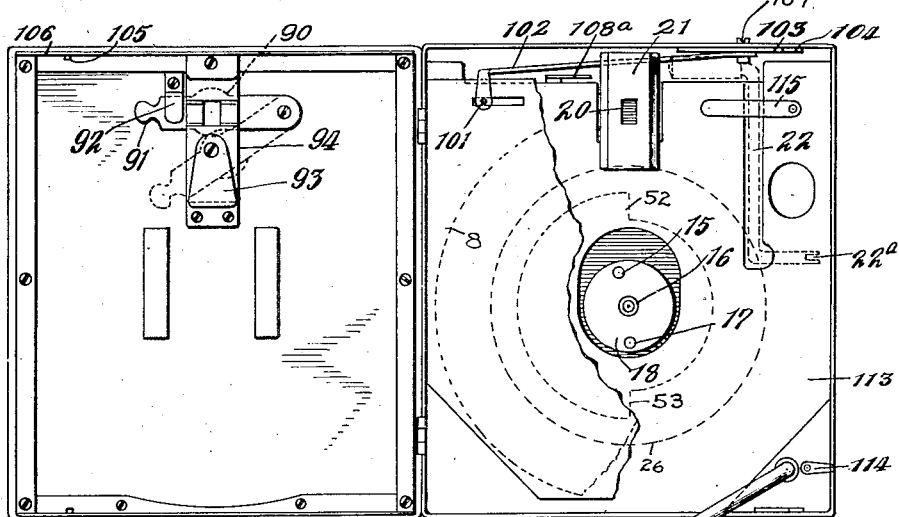
Fig. 1 is a plan view of my improved form of camera in an open position to disclose the relative positions of the film magazine or holder and co-operating parts, whereby the camera may be functioned for taking pictures, or as a projector or graphoscope.

To function the camera for taking photographs of moving objects, the film holder is positioned within the casing 7, as shown in Fig. 1, so that the apertures 10, 11 and 12 are seated upon the studs 15, 16 and 17 of the turn table or support 18. This brings the exposure opening 19 provided on the edge of the film holder, as shown in Figs. 11 and 12, in alignment with the opening 20 in the plate 21 supported on the frame 21$^a$ and forming a bed or table over which the edge of the film 8 is adapted to travel when rotated by the actuating mechanism operated by the crank 22.

The mechanism for rotating the film 8 across the plate 21 consists of a disc 26 having a toothed or serrated periphery, as shown at 27, which is mounted on the underside of the plate 23, one end of said plate being stepped down at 24 and provided with an elongated slot 25 whereby the plate 23 is fastened to the plate 28 by means of a screw or the like 23$^a$, the said slot 25 permitting of longitudinal movement of the plate 23, at a certain stage of the film feeding operation, as hereinafter set forth.

The disc 26 is actuated by the pawl 29 engaging the teeth 27 on the periphery thereof, said pawl being pivoted on a plate 30 mounted to rotate with the pinion 31 which is in mesh with the teeth of the gear wheel 32 having bearings in the plate 28 and the bracket 33 formed integral therewith. The gear wheel 32 is adapted for rotation by means of the crank 22, the end of which is slotted at 22$^a$ to engage a transverse pin 32$^a$ in the sleeve 32$^b$ positioned in the hub of the wheel 32.

Pivoted to the plate 28 at one end, as indicated at 34, and having a curved guide slot 35 therein adapted to ride about a screw or pin 36 in the plate 28, is a rocker arm 37 to which is fastened a spring 38 as shown at 39, this spring riding in an aperture 40 provided in the active surface 41 of the pawl 29 to hold the latter in constant engagement with the teeth of the disc 26. The other end of the rocker arm is pivoted to the plate 23 so that the said arm is movable therewith.

Positioned beneath the plate 28 and guided in its movement by the projections 42$^a$ riding in the slots 28$^a$ of the plate 28, is a plate 42 which is adapted to be reciprocated by the movement of the button 43 having a reduced portion 43$^a$ connected to said plate and projecting through the slot 44 in the face of the camera casing. This plate 42 has a slot 42$^b$ with two straight portions and an intermediate diagonal portion formed therein within which the pin 45 of the stop plate 46 is movable, it being obvious thereby that the movement of the plate 42 in a direction longitudinally of the plate 28 will move the plate 46 in a direction transversely of the latter. (See Figs. 3 and 16.)

From the description thus far given it will be seen that the film is fed past the opening 20 by the rotation of the disc 26 under the influence of the pawl 29, whereby the turn table 18 is rotated on its axis by means of the gear wheel 47 rotating with the disc 26 meshing with the teeth of the pinion 48 keyed to the turn table, the said pawl 29 bearing upon the extension arm 49 of the plate 23 which guides said pawl in its movement.

As previously stated, the film 8 is arranged for two concentric rows of exposures, the outer row in the present showing containing sixty five exposures, while the inner row is made to receive fifty five. Therefore, provision must be made for bodily shifting the film upon the completion of the exposures in the outer row, so that the inner row may be brought into registry with the opening 20 in the plate 21. To this end the disc 26 is provided on its undersurface with an annular plate 50, a portion of the periphery of which is cut away at 51 to form diametrically opposite peripheral stops 52 and 53, as shown in dotted lines in Figs. 1, 2 and 3, respectively. Rigidly secured to the underface of the plate 50 and rotating on the axis 26ª of the disc 26 is a cam 54 adapted for engagement by the free ends of the springs 55 and 56, respectively, which are held in position by means of the screws 57, the inactive ends of said springs bearing against the pins 58 and 59 positioned in the plate 28. The teeth of one half of the periphery of the disc 26 are pitched to number sixty five, while those on the other half number fifty five, to correspond with the number of exposures to be made in each of the concentric rows of the film 8.

When the parts now being described are in the position shown in Fig. 2, the surface of the film to produce the outer row of exposures is in position to register with the opening 20 in the plate 21, and as the crank 22 is revolved the film is fed past said opening 20 by the clockwise rotation of the disc 26, the plate 50 and the cam 54 revolving therewith until the projection or nose 52 of the plate 50 contacts with the pin 59, whereupon the cam 54 is in a position opposite to that shown in Fig. 2—in other words, bearing against the free arm of the spring 56. The tension of the free arm of this spring 56 when it is under the compression exerted by the cam 54 in contact therewith, overcomes the inertia of the weight of the disc 26 and its co-operating elements, and effects a longitudinal movement of the plate 23 together with the parts carried thereby. This moves the nose or projection 52 out of contact with the pin 59 so that it may pass the same and permits of the continued rotation of the disc 26 in its second position whereby the inner row of the exposure surface of the film 8 is in registry with the opening 20 in the plate 21.

It is essential to prevent further operation of the film feeding mechanism on the completion of the second row of exposures, and, therefore, upon placing a film in position on the turntable 18 for exposure, the button 43 on the face of the camera is moved to the position shown in Fig. 16. By this means, the stop plate 46 is moved transversely of the plate 28 as heretofore explained, to the position shown in Fig. 3 so that, upon the completion of the second or inner row of exposures on the surface of the film, the nose 52 of the plate 50 will abut against the upturned stop 60 carried by said plate 46 and prevent further actuation of the film feeding mechanism. As will be observed from Fig. 3 of the drawings, the stop 60 functions to limit the further movement of the plate 50 just before the periphery thereof adjacent to the nose 53 clears or passes the pin 59, so as to prevent the longitudinal movement or shifting of the plate 23 and the parts carried thereby, including the plate 50, under the influence of the spring 55, in the manner previously explained.

To release the film feeding mechanism, the button 43 is moved to a position opposite that shown in Fig. 16 whereby the plate 46 takes the position shown in Fig. 4. The movement of the disk 26 by the engagement of the pawl 29 with one tooth thereof by the manipulation of the crank 22 will then effect the movement of the periphery of the enlarged portion of the plate 50 immediately adjacent to the nose 53 out of engagement with the pin 59 and permit the spring 55 to function to move the disk 26 and its cooperating elements to the position shown in Fig. 2, when they are again ready for operation to feed the film past the opening 20. As soon as the actuating mechanism has been freed, the button 43 may be moved to the position shown in Fig. 16 so as to render the actuating mechanism inoperative upon the completion of the film exposure.

As heretofore explained, the spring 38 for holding the pawl 29 in engagement with the teeth of the disc 26 is fastened to the rocker arm 37, the latter being movable with the plate 23. By this arm 37 following the movement of the plate 23, the tension of the spring 38 is maintained substantially constant so that when the disc 26 and its co-operating elements are in position for exposing the inner row of exposures on the surface of the film 8, and the pawl 29 is in substantially the position shown in Fig. 3, the engagement of said pawl with the teeth of the disc 26 will be positively maintained.

The shutter and its actuating mechanism comprise a fixed plate 61 formed with an exposure opening 61$^a$ in alinement with the openings 7$^c$ and 20 respectively and having U-shaped flanges 62 on each side thereof, which form guideways for the movable plate 63 also provided with U-shaped flanges on its longitudinal edges. The latter element has a pin 64 positioned adjacent to one end thereof which rides in a slot 65$^b$ in the lever 65, said lever having a pivotal connection with the plate 28 when my improved type of camera, projector and graphoscope is being used as a camera for taking pictures of objects in motion. Connected to the other end of the lever 65 adjacent to its pivotal connection with the plate 28 is a lever 66 pivoted to the plate 30 which is actuated by the gear wheel 32 meshing with the pinion 31, this structure being clearly shown in Figs. 2 and 9. As the gear wheel 32 is rotated through the medium of the crank 22, the lever 65 is rocked on its fulcrum and reciprocates the guide plate 63 in the ways formed on the plate 61. Mounted to move within the guide plate 63 is the shutter 67 which is provided with an exposure opening 68 adapted to register with a similar exposure opening 69 in the guide plate 63, and which has a spring arm or extension formed thereon, as shown at 70. This spring arm or extension has a depending flange 71 at one end thereof, which is adapted to be engaged by the upturned portion 72 of the end of the guide plate 63. Therefore, when the guide plate 63 is moved toward the left, viewing Figs. 2 and 5, this portion 72 engages the flange 71 on the spring arm 70 of the shutter 67 so that the guide plate 63 and the shutter move as a single unit against the tension of the shutter actuating spring 73 which is fixed to the casing, as shown at 74, its free end passing through an aperture in the upturned ear 75 on the shutter 67, until the end of the shutter arm or extension 70 abuts against and rides up the beveled surface of the stop 76 positioned at one end of the plate 61. This raises the flange 71 of the spring arm or extension 70 out of engagement with the projection 72 on the guide plate 63 and permits the shutter to function under the impulse of the spring 73, the movement of the shutter being limited by the yielding stop 77 which is preferably of rubber or a similar material fastened to one of the faces of the focus finder box 78, positioned within the casing, as shown in Fig. 2, when the guide plate 63 reaches the limit of its movement to the left, the exposure opening 69 therein is in registry with the exposure opening 61$^a$ in the plate 61. As the arm 70 is disengaged from the portion 72 of the plate 63 the rapidity of the return of the shutter 67, under the impulse of the spring 73, to its normal position, as shown in Fig. 5, brings the exposure opening 68 in said shutter into alinement or registry with the openings 69 and 61$^a$, respectively, before the guide plate 63, by reason of the lost motion connection 64 and 65$^b$, starts on its return movement under the continued actuation of the lever 65. The relative positions of the several elements, when an exposure of the film is taking place, are clearly shown in Fig. 6.

When it is desired to employ my invention as a projector or as a graphoscope, the button 79 movable in the slot 79$^a$ on the exterior of the casing 7 is moved to a position opposite to that shown in Fig. 16. This button is connected to the plate 80 as shown at 79$^b$, the surface of said plate adjacent to one end thereof, being formed with a slot 81 having two straight portions and an intermediate diagonal portion, within which the screw 82 moving in the slot 83 in a portion of the plate 28 is adapted to travel. This screw has a member 84 connected thereto which is moved in the said slot 83 of the plate 28 and which, when the parts now being described are in the position shown in Fig. 2, co-operates with the opposed surface of the said slot 83 to form a pivotal bearing for the arm 65, heretofore described. However, the movement of the button 79, as just explained, which brings the parts into the position shown in Fig. 9, effects a change in the relation of the member 84 to the pivot 65$^a$ of the arm 65 so that the initial movement of the actuating mechanism through the medium of the crank 22 will render the lever ineffective upon the guide plate 63, the latter and the shutter 67 coming to rest with their respective exposure openings in registry with the lens opening 7$^c$ and the opening 20 in the plate 21.

Any positive or negative film, of the proper shape and size which it is desired to project, is now positioned on the turn table, the film feeding mechanism actuating as heretofore explained, with the exception that the stop plate 46 may be permitted to remain in the position shown in Fig. 2, so that a rotation of the plate 50 and the showing of the pictures on the film may be repeated as often as desired. The proper timing between the exposures to give the "action" effect is obtained by means of a flicker shutter 85 mounted on the arm 86 pivoted to the underside of the plate 28 and having an upwardly projected portion 87 adjacent to its pivot point which is formed for engagement with the cam surface 30$^a$ of the plate 30, whereby the arm 86 will be rocked on its pivot against the tension of the spring 88 on the rotation of the gear wheel 32 through the medium of the crank handle 22. When my invention is employed as a camera, the arm 86 is locked against movement by the extension 89 positioned underneath the plate 28 and which is connected to the member 84 and functioned to engage the arm 86 and hold it against movement by the movement of the said member 84 to its bearing forming position, hereinbefore described.

The closure or cover of the casing 7 has formed therein an aperture 90 provided with a pivotally mounted closure 91 and a spring clamp 92 to hold the closure in position to exclude light from the interior of the camera, as shown in Fig. 1. Where it is desired, the closure may be moved to the position shown in dotted lines in Fig. 1, and the mica or other substitute for ground glass 93 fixed to the apertured spring plate 94 may be moved into position to cover the said aperture, this spring plate 94 co-operating with the table 21 to hold the film 8 in proper feeding position during the functioning of the camera. When my invention has been prepared for use as a projector, the closure for the aperture 90 may be displaced and a suitable light disposed behind the camera so that the rays may be concentrated on the film and the pictures projected through the lens on to a screen.

When it is desired to use my invention as a graphoscope, the parts are set to operate the same as they do for using the device as a projector, when the pictures may be viewed through the opening 90 in the cover of the camera. If desired, a magnifying glass 95 of the general structure shown in Fig. 17 may be employed to enlarge the pictures to the vision of the person using the device.

The film holder or magazine 9, is provided with a paper mask 96 which is formed with an exposure opening on each side, these openings being in staggered relation to each other, as shown at 97 and 98, in Fig. 12. The sides of the film holder or magazine are slotted, as shown at 99, and the mask 96 is apertured adjacent to these slots, as indicated at 100, for engagement by the pin 101 carried by the projecting portion of the arm 102, which is pivoted to the plate 103 mounted to slide on the inner wall of the camera, and which is slotted at 104 to engage the detent 105 on the flange 106 of the cover and lock the camera against accidental opening when in use. A similar locking plate is disposed on the opposite side of the camera. When the film is placed in position, the pin 101 is placed in the aperture adjacent thereto, as shown in Fig. 1, and when the sliding plate 103 is moved by means of the finger button 107 which is necessary to lock the cover of the camera in position, the mask 96 is moved so that the opening therein on the side of the film holder adjacent to the opening 20 in the plate 21 will register with the exposure opening 19 in the film holder. When the film on this side has been completely exposed, the film holder is reversed and the film on the opposite side is then made ready for exposure in the manner just described.

In order to move the mask actuating arm 102 out of functioning position when my invention is being used as a projector or graphoscope, the film holder being dispensed with as previously pointed out, I provide a plate 108 having a slotted engagement with the screw 109 in the wall of the casing, and which is formed with an extending portion having spaced apart upturned ears 110, these ears being adapted to be engaged by the projection 111 of the plate 80 which operates upon the shutter actuating spring 73, whereby the plate 108 may be moved in a longitudinal direction, the position of the plate 108 being as shown in Fig. 9, when my invention is functioning as a projector or graphoscope. In this position the upturned end 108$^a$ of the plate 108 abuts against the face of the arm 102 and holds it against the side of the camera.

If desired, a cup for an additional lens, screen or the like, may be provided as shown at 112, the operating parts and film holder being covered and protected by the plate or closure 113 which has the various cutout portions shown for the accommodation of the several parts, and which is locked in position by the engagement of the pivotally mounted finger 114 with a slot in the wall of the camera casing. 115 indicates the spring arm for holding the operating crank 22 in the recessed portion of the closure provided for the purpose, as shown in Fig. 1.

For supporting the camera on a table or the like, a folding bracket is provided, the construction and operation of which is clearly apparent from Fig. 16.

From the foregoing description it will be obvious that my invention may be expeditiously converted from one use to another and that the mechanism employed for functioning it as a camera, projector or graphoscope, is simple, efficient and positive in operation.

Having thus described my invention what I claim as new and desire to secure by Letters Patent of the United States is:—

1. A camera adapted for photographing moving objects and to be used as a projector, comprising mechanism for rotatively feeding an annular flat film, past an exposure opening, means for bodily shifting the film feeding mechanism to photograph a series of pictures on the film means for limiting the operation of the film feeding mechanism on the completion of the last exposure of the film, and means operable by a single movement for functioning said camera as a projector, the said film feeding mechanism being capable of operation to repeatedly project the pictures on said film to produce a motion picture.

2. A camera for photographing moving objects on a flat annular film, comprising a rotatable film feeding mechanism, a shutter synchronized therewith, means for automatically shifting the position of said film feeding mechanism upon the completion of the exposure of a portion of the sensitized surface of the film whereby the remaining sensitized surface of the film may be submitted to exposure, means for rendering said shutter inoperative, and a flicker shutter adapted to be synchronized with said film feeding mechanism whereby said camera may function as a projector of motion pictures.

3. A camera for photographing moving objects on a flat annular film, comprising a rotatable film feeding mechanism embodying a film support, a shutter synchronized to operate with said film feeding mechanism, means for automatically shifting the position of said film feeding mechanism upon the completion of the exposure of a portion of the sensitized surface of the film whereby the remaining sensitized portion of the film may be submitted to exposure, said means including spring members and a cam adapted to co-operate therewith, a stop, and means forming a part of the film feeding mechanism adapted for engagement by said stop to prevent the actuation of said film feeding mechanism upon the completion of the exposure of said remaining sensitized surface of the film.

4. A camera for photographing moving objects on a flat annular film provided with an exposure opening and comprising a rotatable film feeding mechanism embodying a cam, a support for said film feeding mechanism and oppositely positioned springs having portions disposed in the path of movement of said cam whereby at predetermined points in the rotation of said film feeding mechanism the said support and the mechanism carried thereby will be automatically shifted to change the position of the film relative to said exposure opening.

5. A camera for photographing moving objects on a flat annular film, comprising a rotatable film feeding mechanism embodying a cam, a support for said film feeding mechanism, a pair of oppositely positioned springs having portions disposed in the path of movement of said cam, means for rotating said film feeding mechanism and said cam whereby said cam will alternately engage and compress said spring portions, and means operable at a predetermined point in the rotative movement of said film feeding mechanism to permit of the expansion of the spring in engagement with said cam to shift the film feeding mechanism and its support.

6. A camera for photographing moving objects on a flat annular film, comprising a rotatable film feeding mechanism embodying a cam, a support for said film feeding mechanism, a pair of oppositely positioned springs having portions disposed in the path of movement of said cam, means for rotating said film feeding mechanism and said cam whereby said cam will alternately engage and compress said spring portions, means operable at a predetermined point in the rotative movement of said film feeding mechanism to permit of the expansion of the spring in engagement with said cam to shift the film feeding mechanism and its support, and a stop for rendering the film feeding mechanism inoperative.

7. A camera for photographing moving objects on a flat annular film having an exposure opening, and comprising rotatable film feeding mechanism, embodying a cam and a film support, a shutter adapted to operate in synchronism with said film feeding mechanism, means including a spring adapted to co-operate with said cam to effect the shifting of said film feeding mechanism at a predetermined point in its operation, a flicker shutter adapted to operate in synchronism with said film feeding mechanism when said camera functions as a graphoscope, and means operable by a single movement to simultaneously render said first mentioned shutter inoperative and said flicker shutter operative.

8. A camera adapted to be used for photographing moving objects and as a graphoscope, comprising film feeding mechanism, a photographic shutter mounted to operate in synchronism with said film feeding mechanism, a flicker shutter mounted to remain inactive during the functioning of said photographic shutter, and means operable by a single movement to simultaneously render said photographic shutter inoperative and function said flicker shutter to operate in synchronism with said film feeding mechanism.

9. A camera adapted to be used for photographing moving objects and as a graphoscope, comprising film feeding mechanism, a photographic shutter mounted to operate in synchronism with said film feeding mechanism, a flicker shutter mounted to remain inactive during the functioning of said photographic shutter, means operable by a single movement to simultaneously render said photographic shutter inoperative and function said flicker shutter to operate in synchronism with said film-feeding mechanism, and means for alternately shifting said film feeding mechanism to operate in each of two zones, said film feeding mechanism being capable of continuous operation.

10. A camera adapted for photographing moving objects and to be used as a projector, comprising mechanism for rotatively feeding an annular flat film past an exposure opening, means for bodily shifting the film feeding mechanism to photograph concentric rows of pictures thereon, means for limiting the operation of the film feeding mechanism on the completion of the last exposure of the film, means operable by a single movement for functioning said camera as a projector, the said film feeding mechanism being capable of operation to repeatedly project the pictures arranged in concentric rows on the film whereby a moving picture is produced.

11. In a camera, the combination of an annular film, a substantially flat flexible film holder therefor, an exposure opening in said film holder, a mask for said opening, means for rotating the film within said holder, and means for moving said mask to uncover the exposure opening in said film holder.

12. In a camera, the combination of a film holder adapted to contain a pair of annular film discs, a light-proof partition disposed between said discs, means for joining said discs and partition together, whereby said partition and said discs may be rotated as a single unit, an exposure opening in said film holder adjacent to one edge thereof, a mask in said film holder to close said opening, said films rotating within said mask, an opening in each side of said mask adapted to register with the exposure opening in said film holder, and means for moving said mask to bring either of said openings therein into registry with the exposure opening, whereby the exposure of one film may be effected without exposing the other.

13. In a camera, the combination of film feeding mechanism, a shutter and shutter operating mechanism, a film holder, a circular film positioned within said film holder, means for connecting said film to said film feeding mechanism, whereby said film will be rotated within said film holder, an exposure opening in said film holder, a mask for said film disposed within the film holder and provided with an opening adapted to register with the exposure opening in said film holder, and means carried by said camera cover adapted for engagement with said mask and automatically operable to move said mask to bring the opening therein into registry with the exposure opening of the film holder on locking the cover of the camera casing in closed position.

14. A combined moving picture camera and projector comprising film feeding mechanism, a photographic shutter, a projecting shutter, means for selectively operating said shutters in synchronism with said film feeding mechanism, and means operable by a single movement for rendering one shutter operating means operative and the other inoperative.

15. A camera adapted to be used for photographing moving objects and as a graphoscope, comprising film feeding mechanism, a photographic shutter, mounted to operate in synchronism with said film feeding mechanism, a flicker shutter, means adapted to render said photographic shutter inoperative, and means for shifting said film feeding mechanism to permit of the continuous operation thereof, said flicker shutter operating in synchronism with said film feeding mechanism.

16. A camera adapted for photographing moving objects and to be used as a projector, comprising mechanism for rotatively feeding an annular flat film past an exposure opening, a photographic shutter and a flicker shutter mounted to operate in synchronism with said film feeding mechanism, means for bodily shifting the film feeding mechanism to photograph a series of pictures on the film carried thereby, means for limiting the operation of the film feeding mechanism on the completion of the last exposure of the film, means for rendering said photographic shutter inoperative when said camera is used as a projector, and means for permitting the continuous operation of said film feeding mechanism to repeatedly project a series of pictures on a film carried thereby, the operation of the flicker shutter in synchronism with the film feeding mechanism producing motion pictures.

MAGNUS NIÉLL.